United States Patent
Lee et al.

(10) Patent No.: US 7,244,460 B2
(45) Date of Patent: Jul. 17, 2007

(54) TRIPOLYPHOSPHATE PET FOOD PALATABILITY ENHANCERS

(75) Inventors: Yanien Lee, Blackfoot, ID (US); Zulin Shi, Naperville, IL (US); Jiunn-Yann Tang, Oak Brook, IL (US); Huoy-Jiun Wang, Aurora, IL (US)

(73) Assignee: NuSci Laboratories LLC, Fairlawn, OH (US)

( * ) Notice: Subject to any disclaimer, the term of this patent is extended or adjusted under 35 U.S.C. 154(b) by 15 days.

(21) Appl. No.: 10/715,198

(22) Filed: Nov. 17, 2003

(65) Prior Publication Data

US 2005/0106285 A1    May 19, 2005

(51) Int. Cl.
*A23K 1/00* (2006.01)
*A23K 1/18* (2006.01)

(52) U.S. Cl. .............. 426/302; 426/549; 426/641; 426/650; 426/656; 426/657; 426/658; 426/805

(58) Field of Classification Search .............. 426/656, 426/658, 641, 657, 549, 805, 650, 302
See application file for complete search history.

(56) References Cited

U.S. PATENT DOCUMENTS

| | | | |
|---|---|---|---|
| 3,115,409 A | 12/1963 | Hallinan et al. ............. 99/7 |
| 3,139,342 A | 6/1964 | Linskey ..................... 99/2 |
| 3,203,806 A | 8/1965 | Young ....................... 99/2 |
| 3,539,357 A | 11/1970 | Appleman ................. 99/107 |
| 3,615,047 A | 10/1971 | Kassens .................... 426/92 |
| 3,615,647 A | 10/1971 | Kassens .................... 99/2 |
| 3,679,429 A * | 7/1972 | Mohmann et al. .......... 426/93 |
| 3,679,492 A | 7/1972 | Fang et al. ................ 148/1.5 |
| 3,708,306 A | 1/1973 | Appleman ................. 99/2 |
| 3,930,031 A | 12/1975 | Kealy ....................... 426/89 |
| 4,215,149 A | 7/1980 | Majlinger ................. 426/292 |
| 4,514,431 A * | 4/1985 | Buckholz et al. .......... 426/641 |
| 5,015,485 A * | 5/1991 | Scaglione et al. ......... 426/94 |
| 5,186,964 A | 2/1993 | Gierhart et al. ........... 426/74 |
| 6,099,879 A * | 8/2000 | Todd, Jr. .................. 426/240 |
| 6,254,920 B1 | 7/2001 | Brunner .................... 426/656 |
| 6,350,485 B2 | 2/2002 | Brunner .................... 426/656 |
| 2005/0037108 A1 | 2/2005 | Lin et al. .................. 426/2 |

* cited by examiner

*Primary Examiner*—C. Sayala
(74) *Attorney, Agent, or Firm*—Synnestvedt Lechner & Woodbridge LLP

(57) ABSTRACT

A palatability enhancing composition for extruded pet food containing at least one tripolyphosphate salt in an amount effective to enhance palatability and at least one ingredient selected from meat products, meat by-products, fish products, fish by-products, dairy products, dairy by-products, sources of microbial proteins, vegetable proteins, carbohydrates and amino acids. Methods for enhancing pet food palatability with the disclosed palatability enhancing compositions and extruded pet food compositions coated therewith are also disclosed.

11 Claims, No Drawings

TRIPOLYPHOSPHATE PET FOOD PALATABILITY ENHANCERS

This invention generally relates to ingestible compositions having increased palatability for animals, whereby a superior palatability enhancer is used as a component or as a coating for the ingestible.

Pet food manufacturers have a long-standing desire to provide foods that combine high nutritional value, and resistance to decomposition and bacterial contamination, with low production costs. In addition, and with particular regard to cat foods, pet food manufacturers desire a high degree of palatability that can be attained at low cost.

Domestic animals, particularly cats, are notoriously fickle in their food preferences. As a result, their owners frequently change types and brands of cat food in order to maintain their pets in a healthy and contented condition. For the most part, the only way to determine the gastronomic preferences of cats is by trial and error.

Dried animal or pet food products are widely marketed for pets such as cats and dogs. Generally, dried pet food products sold commercially have a relatively low moisture content of less than about 15% by weight and can provide excellent nutrition for animals because the low moisture content permits a wider variety of ingredients and a better nutritional combination of ingredients as well as long term product stability.

Dry and semi-dry foods are generally preferred by manufacturers and pet owners alike because such foods are more convenient to store and use, and because of the higher nutritional content than high-moisture pet foods. However, many animals, and particularly cats, are picky eaters desiring a high degree of palatability. There remains a need for a low-moisture pet food with a high degree of palatability.

Dry pet foods exhibit a number of advantages over pet foods having higher moisture contents. The dry foods are generally more nutritious on an equal weight basis, require less expensive packaging, have better keeping qualities and are more convenient to use.

Typically, such dried food products are expanded or puffed products produced by extrusion techniques. Extrusion cooking processes for the production of dried pet foods have been a significant factor in the growth of this market segment because of the better cooking achieved with this type of process, better mixing of ingredients, as well as, the desirable texture achieved with a puffed or expanded product.

Dry products produced by this type of process are generally well accepted by the animal but they are significantly lower in palatability than canned or high moisture products that typically are all meat products with a moisture content above 50% by weight. This problem is especially pronounced with cat foods since cats have long been recognized as sporadic or "finicky" eaters, and they generally ignore dried food products in preference to meat and high moisture foods. Therefore, although a dry product is extremely convenient to use by the pet owner and exceptionally nutritious, a need has continuously existed for additives or ingredients which can be included in the food product to increase the palatability of the product, without reducing the nutritive properties.

There are a number of processes disclosed in the art for improving the palatability and other characteristics of dry pet food. Palatability may be enhanced by the application of liquid or dry flavorings as a coating, however; flavors alone have a limited impact on improving palatability.

Palatability enhancers for low moisture pet foods include various surface coating compositions. Liquid or dry animal digest coatings are widely used to enhance palatability, and animal digest is also used in a liquid combination with phosphoric acid. Dry animal digest may be used in a two step coating process with liquid phosphoric acid. Dry application of sodium acid phosphate, which may be used in combination with animal digest, is also known. For example, known palatability enhancers include surface coatings of phosphoric acid; a combination of fat with hexamic, phosphoric or citric acid; and a mixture of phosphoric acid and citric acid.

One problem is that liquid phosphoric acid cannot be added to dry flavors; therefore, palatability enhancers that combine these two ingredients are not commercially available. Unfortunately, dry phosphoric acid is relatively unobtainable, uneconomical, and difficult to handle. However, U.S. Pat. No. 4,215,149 discloses that the dry application of sodium acid phosphate (SAP) is equal or superior to phosphoric acid.

U.S. Pat. No. 3,115,409 to Hallinan et al. is directed to pet foods having a high acid content and a minimum disclosed moisture content of 30 percent. The pH of the pet food is adjusted to low levels and then the pet food is cooked to alter the proteinaceous material contained therein. This type of procedure is commonly practiced in the food industry to inhibit bacterial decomposition and to hydrolyze proteinaceous materials in order to develop more flavorful products. In order for the reaction to take place, relatively large quantities of water are necessary. U.S. Pat. No. 3,139,342 to Linskey relates to an animal food process wherein the food is produced in the form of pellets, which may be coated with various taste enhancing and/or nutrition supplementing materials, e.g., fat and Vitamin A. U.S. Pat. No. 3,203,806 to Young relates to a pet food having acetamide and acetic acid incorporated therein for improved palatability. The palatability improvers may be added to dry or semi-dry pet foods by being sprayed thereon.

U.S. Pat. No. 3,539,357 to Appleman et al. relates to a method of preparing animal food having relatively high moisture content whereby heated meat tissue is treated with an acid to produce a breakdown of the proteins and comminuting the treated material. U.S. Pat. No. 3,615,647 to Kassens is directed to a porous, expanded animal food in the form of chunks coated with fat which coating is, in turn, overlaid with a coating of dextrin. U.S. Pat. No. 3,679,492 to Mohrman et al. relates to a method for improving the palatability of dry cat food by coating particles of the food with fat and a flavor enhancing acid, specifically, citric, phosphoric or hexamic acids. U.S. Pat. No. 3,708,306 to Appleman relates to a pet food containing psyllium byproducts wherein dicalcium phosphate is incorporated. The dicalcium phosphate is blended into the pet food together with other ingredients in the form of a batter which is then baked. U.S. Pat. No. 3,930,031 to Kealy is directed to a cat food composition having a coating comprising a flavor enhancing mixture of phosphoric and citric acids.

U.S. Pat. No. 5,186,964 discloses the use of dry or liquid Sodium Acid Pyrophosphate (SAPP) as part of a coating to improve palatability of dry pet food.

U.S. Pat. No. 6,254,920 B1 and U.S. Pat. No. 6,350,485 B2 disclose improving palatability of dry and semi dry cat food using Tetrasodium Pyrophosphate (TSPP). Several other phosphate salts have been suggested, but none have been successful in replacing TSPP or SAPP.

Current compositions and methods remain limited in the resulting degree of increased palatability.

SUMMARY OF THE INVENTION

The enhancers of the present invention provide a superior enhancement in the palatability of ingestible compositions, particularly for dry and semi-dry pet foods. The enhancers of the present invention are relatively low in cost, easily used and can be incorporated into many forms and formulas of ingestible product.

Therefore, according to one aspect of the present invention, a method is provided in which a palatability enhancer containing at least one tripolyphosphate salt in an amount effective to enhance palatability is applied to an extruded pet food composition to increase palatability. The tripolyphosphate salt can be a sodium salt, a potassium salt, or mixed sodium and potassium salts. For purposes of the present invention "applied" is defined as including both adding at least one tripolyphosphate salt to a pet food formulation in an amount effective to enhance the palatability of the extruded composition prior to extrusion, as well as coating an extruded pet food composition with a palatability-enhancing quantity of at least one tripolyphosphate salt after the pet food composition has been extruded.

The palatability enhancer, which preferably includes from about 0.1% to about 99% by weight of one or more sodium tripolyphosphate salts, is preferably topically applied to dry pet food pellets or kibbles after extrusion. Other constituents of the palatability enhancer can include one or more ingredients selected from meat, meat by-products, fish, fish by-products, dairy, dairy by-products, microbial proteins, vegetable proteins, amino acids, and carbohydrates. Additional ingredients, including other natural and artificial flavors, other palatability-enhancing acids and salts thereof, vitamins and mineral supplements, anti-oxidants, preservatives, inorganic salts, and the like, may also be utilized.

The palatability enhancer can be applied to the kibbles as a dry powder via a dusting process, or may be sprayed onto the kibbles as a liquid. The palatability enhancer is preferably applied in an amount sufficient to contribute from about 0.01 to about 5.0% by weight of one or more tripolyphosphate salts by weight to the pet food composition.

The present invention also includes palatability enhancing compositions utilized in the inventive method. Therefore, according to another aspect of the present invention, palatability enhancing compositions for extruded pet food compositions are provided containing at least one tripolyphosphate salt in an amount effective to enhance palatability and at least one ingredient selected from animal products, animal by-products, fish products, fish by-products, dairy products, dairy by-products, sources of microbial proteins, vegetable proteins, carbohydrates and amino acids.

The present invention also includes extruded pet food compositions coated with the palatability enhancing compositions of the present invention.

DETAILED DESCRIPTION OF PREFERRED EMBODIMENTS

The palatability enhancing compositions of the present invention are prepared from tripolyphosphate salts, and, in particular, sodium tripolyphosphate (STPP) and potassium tripolyphosphate (KTPP), as well as mixed salts of sodium and potassium tripolyphosphate. Preferably, the palatability enhancing compositions contain one or more sodium tripolyphosphate salts derived from STPP. Accordingly, the preferred embodiments will be described with reference to STPP. However, the KTPP and mixed tripolyphosphate salts of sodium and potassium may be substituted for STPP and the use of KTPP and mixed tripolyphosphate salts are included within the scope of the present invention.

Methods according to the present invention apply the palatability enhancing compositions of the present invention to extruded pet food compositions in a quantity sufficient to enhance palatability of the finished pet food product.

STPP has the formula $Na_5P_3O_{10}$. When dissolved in solution, depending upon pH, STPP may partially or completely dissociate to form one or more additional species including the free tripolyphosphate anion, and mono-, di-, tri- and tetra-sodium salts thereof, in which, after liquid product has dried on an extruded pet food product, one, two, three, four or five sodium atoms are replaced with hydrogen atoms. Accordingly, palatability enhancers of the present invention in which the STPP has been dissolved in solution and permitted to equilibrate are referred to as containing one or more sodium tripolyphosphate salts, and for purposes of the present invention "STPP" and "sodium tripolyphosphate" is defined as including all possible salts and salt combinations. The palatability enhancers can be liquid palatability enhancers or palatability enhancers that are subsequently dried by evaporation, lyophilization, and the like to form a dry product.

The exact ratios of the five tripolyphosphate salts to the total tripolyphosphate content can be readily determined by one of ordinary skill in the art knowing the final solution pH without undue experimentation by employing the Henderson-Hasselbach equation and using the $pK_a$'s of the sodium tripolyphosphate salts, which are known physical constants.

When dry-blended with other dry palatability enhancer ingredients the STPP will not dissociate. STPP added in dry form to essentially dry palatability enhancer formulations will remain essentially STPP.

In accordance with this invention, the palatability enhancer is applied to the surface of dry pet food, usually in the form of pellets or kibbles, and may be used in conjunction with either other palatability enhancing ingredients. While the palatability enhancers of the present invention can be used as an ingredient incorporated in the composition of the pet food product itself, used as a coating less enhancer is required and the animal receives the maximum exposure to the enhancer. The enhancer compositions used for coating can be liquid or dry. This will depend on a number of factors including the target animal, the product to be coated, costs of ingredients, flavoring agent to be used and coating equipment to be used.

As referred to within this description, pet foods generally relate to a nutritionally balanced mixture of proteinaceous and farinaceous materials having a moisture content of about 50% or less by weight. Such mixtures are known as dry or semi-dry pet foods to those skilled in the art, and the palatability enhancer is applied to pieces of the dry or semi-dry food. The pet food compositions described herein are not intended to be limited to a specific listing of ingredients because such ingredients will depend on such factors as, for example, the desired nutritional balance for the specific type of pet, and availability of ingredients to the manufacturer. In addition to the proteinaceous and farinaceous materials, the pet food composition may include vitamins, minerals, and other additives such as flavorings, preservatives, emulsifiers and humectants. The nutritional balance, including the relative proportions of vitamins, minerals, fat, protein and carbohydrate, is determined according to dietary standards known in the veterinary art. For example, the nutritional balance of a cat food composition is determined according to the known dietary requirements for cats.

Suitable proteinaceous material may include any material having a protein content of at least about 15% by weight including vegetable proteins such as soybean, cotton seed, and peanut; animal proteins such as casein, albumin, and fresh animal tissue including fresh meat tissue and fresh fish tissue; and dried or rendered meals such as fish meal, poultry meal, meat meal, bone meal and the like. Other types of suitable proteinaceous materials include wheat gluten or corn gluten, and microbial proteins such as yeast.

Suitable farinaceous material may comprise any material having a protein content of less than about 15% by weight and containing a substantial proportion of starches or carbohydrates, including grains such as corn, milo, alfalfa, wheat, barley, rice, soy hulls, and other grains having low protein content. In addition to the proteinaceous and farinaceous materials, other materials such as whey and other dairy by-products, as well as other carbohydrates may be added. In addition, known flavorings including, for example, corn syrup or molasses, may be added.

In one example, the palatability enhancer is applied to a dry cat food composition. Generally, the term cat food composition as used herein applies to commercially sold, nutritionally balanced food compositions that are intended to provide substantially the sole diet for a cat. Thus, such compositions may be described as having a minimum protein content at which cat health is maintained. However, the minimum protein content of the food varies according to the age and breeding status for the animal. For example, a nutritionally balanced cat food composition for breeding females and kittens requires a minimum protein content of at least about 28% by weight on a dry matter basis. A nutritionally balanced cat food composition for non-breeding and adult cats requires a minimum protein content of about 26% by weight on a dry matter basis. More typically, the protein content of commercially available cat food compositions for adult, non-breeding cats is about 30% by weight on a dry matter basis, to insure that the food meets the nutritional requirements of any cat.

For example, a typical formula well known in the art for a dry cat food composition to which the palatability enhancer is applied is as follows:

- 0%–70% by weight grain-based meal or flour, such as corn, wheat, barley or rice;
- 0%–30% by weight animal by-product meal, such as poultry or beef meal;
- 0%–25% by weight corn gluten meal;
- 0%–25% by weight fresh animal tissue, such as poultry or beef tissue;
- 0%–25% by weight soybean meal or flour;
- 0%–25% by weight fresh fish tissue;
- 0%–20% by weight seafood-based meal;
- 0%–10% by weight animal fat;
- 0%–10% by weight high fructose corn syrup;
- 0%–10% by weight dried molasses;
- 0%–1.5% by weight phosphoric acid; and
- 0%–1.5% by weight citric acid.

Additionally, vitamins and minerals are added according to known American Association of Feed Control Officials (AAFCO) guidelines. Such AAFCO Cat Food Nutrient profiles include calcium carbonate, potassium chloride, sodium chloride, choline chloride, taurine, zinc oxide, ferrous sulfate, vitamin E, vitamin A, vitamin $B_{12}$, vitamin $D_3$, riboflavin, niacin, calcium pantothenate, biotin, thiamine mononitrate, copper sulfate, folic acid, and pyroxidine.

Dry pet food may be prepared by a variety of methods. One such method that is widely used on commercial basis is the cooker-extruder method. In the cooker-extruder method, dry ingredients are first blended together to form an admixture. This admixture is transferred into a steam conditioner where it is sufficiently moistened to become extrudable. The admixture then enters a cooker/extruder where it is cooked at an elevated temperature and pressure and then forced out of the apparatus through a die. This die forms the extruded product into a specific shape. Individual pieces of product are created by periodically slicing off the end of the extruded stream of product. The individual pieces, or kibbles, are then dried in a hot air dryer. Generally, the product is dried until it contains less than about 15 percent moisture, and preferably about 9 to 12 percent moisture. The dried particles or pieces are then transferred by bulk conveyor to a coating drum and sprayed with animal fat. Other liquids such as, for example, citric acid or phosphoric acid may alternatively be applied to the pieces, or applied in addition to the animal fat. The resulting pellets or kibbles constitute the basal composition to which a coating of the palatability enhancer is applied.

Coating, as used herein, refers to the topical deposition of the palatability enhancer onto the surface of the basal composition, such as by spraying, dusting, or the like. For example, kibbles of uncoated, extruded basal cat food can be placed in a container such as a tub or coating drum for mixing. A fat, such as lard or tallow, is heated and then sprayed onto the cat food in any convenient manner to obtain a coating of the kibbles. The coating need not be a continuous layer, but preferably is uniform. After the fat cools, the palatability enhancer may be applied as either a dry power or a liquid while the product is mixing. A liquid palatability enhancer is typically sprayed on while a dry palatability enhancer is typically dusted on, preferably through a mesh screen to make the application more uniform on the kibbles. Alternatively, a palatability enhancer can be mixed with the fat and applied concurrently. Note that multiple coatings may be applied to achieve uniformity of the coating.

STPP is commercially available as a dry powder, granules, or an encapsulated form from Haifa Chemicals, Ltd. Of Israel. The STPP may be combined with other palatability-enhancing ingredients such as animal products and by-products, fish products and by-products, dairy products and by-products, microbial proteins, amino acids, carbohydrates, and the like. The exact proportion of STPP and other palatability-enhancing ingredients used in the palatability enhancer, as well as the relative proportion of the palatability enhancer to the finished animal food product, may be varied and are influenced by such factors as relative availability of the ingredients, cost, and health of the animal. In addition, the palatability enhancer described herein is not intended to be limited to a specific listing of ingredients because such ingredients will similarly depend on availability and cost of ingredients to the manufacturer.

For purposes of the present invention "animal" products and by-products are defined as including meat product and by-products from animal species other than fish. Examples of animal products and animal by-products that can be used include, but are not limited to, products and by-products derived from beef, pork, sheep or lamb, poultry, duck, and the like.

Examples of fish products and fish by-products that can be used include, but are not limited to, products and by-products derived from tuna, salmon, cod, whitefish, shrimp, and the like. Examples of dairy products and dairy by-products that can be used include, but are not limited to, products and by-products derived from cheese, milk protein, whey, and the like.

Examples of microbial proteins that can be used include, but are not limited to, brewer's yeast, baker's yeast, and the like. Examples of vegetable proteins that can be used include, but are not limited to, corn gluten, soy protein, soy flour, hydrolyzed vegetable protein (HVP), and the like. Examples of amino acids that can be used include, but are not limited to, alanine, glycine, cysteine, and the like. Examples of carbohydrates that can be used include, but are not limited to, glucose, xylose, fructose, starch hydrolysates, and the like.

Other palatability enhancing acids and salts thereof may also be used, including pyrophosphoric acid and the sodium, potassium, calcium and magnesium salts thereof, phosphoric acid and the sodium, potassium, calcium and magnesium salts thereof, potassium, calcium and magnesium tripolyphosphate salts, potassium, calcium and magnesium hexapolyphosphate salts, organic acids such as citric, tartaric, fumaric, lactic, acetic, formic and hexamic acids and the sodium, potassium, calcium and magnesium salts thereof, and the like. Other suitable ingredients include vitamin and mineral supplements, such as, for example, Vitamin A, dietary calcium supplement salts, and the like, anti-oxidants and preservatives, such as, for example, BHA, BHT, TBHQ, tocopherols, rosemary extract, and the like, other natural and artificial flavors, such as, for example, dairy flavor, roast chicken flavor, and the like.

The palatability enhancers of the present invention contain from about 0.1% to 99% by weight of one or more sodium tripolyphosphate salts. Sodium tripolyphosphate salt levels between about 5 and about 50% by weight are preferred, with levels between about 10 and about 35% by weight more preferred, and levels between about 15 and about 30% by weight even more preferred. The palatability enhancers are formulated and applied so that the one or more sodium tripolyphosphate salts constitute from about 0.01% to about 5.0% by weight of the finished pet food product. Preferably, the palatability enhancers are formulated so that the one or more sodium tripolyphosphate salts constitute from about 0.05 to about 2.0% by weight of the finished pet food product, more preferably between about 0.1 to about 1.0% by weight, and even more preferably between about 0.25 and about 0.75 wt %.

Among the preferred palatability enhancers according to the present invention are palatability enhancers containing from about 5 to about 99 wt. % of one or more products or by-products selected from animal products, animal by-products, fish products, fish by-products, dairy products and dairy by-products. Preferred products and by-products that may be present alone or in combination include animal products and by-products and more preferably products and by-products of beef and poultry. Fish products and by-products are also preferred. A product or by-product level between about 20 and about 70 wt. % is preferred.

Among the same or other preferred palatability enhancers according to the present invention are palatability enhancers containing from about 0.01 to about 10 wt. % of one or more amino acids. Preferred amino acids that may be present alone or in combination include glycine, L-alanine, and the like. An amino acid level between about 0.1 and about 4.0 wt. % is preferred.

Among the same or other preferred palatability enhancers according to the present invention are palatability enhancers containing from about 5 to about 70 wt. % of one or more microbial proteins. Microbial protein levels from about 10 to about 40 wt. % are preferred.

Among the same or other preferred palatability enhancers according to the present invention are palatability enhancers containing from about 0.01 to about 50 wt. % of one or more carbohydrates. A carbohydrate level between about 1.0 and about 30 wt. % is preferred.

One example of a preferred formulation has a solids content of from about 10 to about 40 wt. % of one or more sodium tripolyphosphate salts; from about 30 to about 60 wt % of one or more products or by-products selected from animal products, animal by-products, fish products, fish by-products, dairy products and dairy by-products; from about 25 to about 35 wt. % of one or more sources of microbial proteins; from about 2 to about 4 wt. % of one or more amino acids; and from about 0.5 to about 60 wt % of one or more carbohydrates. Dry formulations have a solids content of about 96 wt %. Liquid formulations may be diluted to a total solids content as low as about 30 wt % with water and preferably to a solids content no more than about 50 wt % to obtain a viscosity and rheology suitable for spray application. The water content may also be supplied by moisture-containing or liquid components, the amounts of which are selected by well-known techniques to maintain the solids content of the product. Liquid formulations according to the present invention have a pH between about 2 and about 9. Preferred liquid formulations have a pH between about 2 and about 3.

One example of a preferred type of liquid palatability enhancer formulation combines about 2–40 wt % STPP with about 20–70 wt % of one or more animal by-products such as beef hearts or livers, or chicken hearts or livers or one or more fish by-products such as fish scraps, or both; about 0.01–5.0 wt % amino acid such as alanine or lysine; about 0.01–1.0 wt % preservatives such as sorbic acid and about 0.01–2.0 wt % enzymes such as protease. Such a liquid formulation based on about 5–15 wt % STPP is more preferred.

To make a liquid palatability enhancer formulation according to the present invention, for example, commercially available liquid ingredients are combined in a mixer. Wet ingredients are ground or emulsified to a slurry and the liquid ingredients are combined therewith. A commercially available protease may be added to the slurry to hydrolyze proteins, and later inactivated with heat, acid or another method. Preservatives such as sorbic acid can also be added. Water is added to adjust the viscosity and the solids content of the slurry to facilitate spray application. In particular, the palatability enhancer is then topically applied to a basal food product that preferably has been previously coated with fat. The wet palatability enhancer is sprayed onto the product so as to achieve a uniform coating and permitted to dry.

A dry formulation of the palatability enhancer is prepared according to one embodiment of the present invention, by combining commercially available dry ingredients, including STPP, amino acids, inorganic salts and organic materials in the desired proportions in a batch mixer and blending to homogeneity prior to drying.

According to another dry formulation embodiment, wet and dry ingredients are combined by mixing the wet ingredients with all or some of the dry ingredients in a mixer until a homogenous mixture is formed. The mixture is dried by evaporation or lyophilization, for example, to form a dry, powdery product that is then blended with any remaining dry ingredients in a tumbler until a homogeneous mixture is formed. If the STPP is among the dry ingredients combined with the wet ingredients prior to drying, the STPP will dissociate to form one or more sodium tripolyphosphate salts within a pH range between about 4 and about 10, and preferably between about 6 and about 8. If the STPP is dry-blended after the wet ingredients are dried, it remains as $Na_5P_3O_{10}$.

One example of a preferred type of dry palatability enhancer formulation combines about 10–30 weight % STPP, about 0.1–4.0 weight % amino acid, such as L-alanine, about 35–50 weight % meat, fish or dairy products or by-products, such as dried chicken liver, and about 20–50 weight % microbial protein such as brewer's yeast.

The palatability enhancer also relates to other pet foods and animal foods in general without regard to the protein content which typically varies according to species, breeding status, and age, among other factors. For example, the palatability enhancer may be used with a dry or semi-dry dog food composition for non-breeding, adult dogs, which requires a minimum protein content of about 18% by weight on a dry matter basis. Similarly, the palatability enhancer may be applied to a dry or semi-dry puppy food having a minimum protein content of about 22% by weight on a dry matter basis. The palatability enhancer may also be used with other dry and semi-dry foods of varying protein content, and with foods for other animals such as livestock and research animals.

EXAMPLES

The following examples illustrate the effect of sodium polyphosphate salts as a palatability enhancer for food for domestic house cats. The test data was obtained by a standard two-bowl test method in which a panel of approximately 20 cats were each presented two different food formulations. The food in each bowl was weighed prior to presenting it to the cat and, when presented, the bowls were positioned side-by-side. The placement of the bowls was reversed daily. Once the food was offered to the cat, the cat was allowed free choice in eating from either bowl for up to 16 hours. After the bowls were removed, the remaining food from each bowl was individually weighed and the difference in weight was recorded as the amount consumed. The amount of food consumed from each of the two side-by-side bowls was then compared to determine the Consumption Ratio (C.R.). Various dry cat food compositions with the STPP were compared for relative palatability with two known palatability-enhancing pyrophosphate salts (TSPP and SAPP).

In separate tests described in Examples 1 through 8, adult cats were each offered products comprising standard dry cat food (Crosswind Industries, Inc., Kansas) each with or without a palatability enhancer coating. The tests were performed over a period of two days with a sampling of 20 or more cats as test subjects. Dry blend coatings were prepared dry. In the spray dried coatings STPP was dissolved in liquid media and permitted to dissociate at pH 4–10 before spray drying. For the sake of simplicity the coatings are referred to as spray dried STPP as compared to the dry-blending of TSPP coating compositions, when, in fact, other pyrophosphate and polyphosphate salts were present.

The coatings for all samples were comprised of dry poultry heart and liver (PH&L) digest prepared in-house by conventional means. Additional ingredients of the coatings included SAPP, TSPP and STPP, all of which were obtained from Haifa Chemicals, Ltd. Of Israel. All percentages are percentages by weight.

Example 1

For a base comparison of other enhancers, a flavor enhancer comprising PH&L digest dry blended with 30% TSPP was used to coat the Standard Cat Food. This was compared with a standard Cat Food coated with a flavor enhancer comprising PH&L digest dry blended with 30% SAPP. The consumption by the subjects of the two foods was essentially the same showing no real preference between the two.

Example 2

A flavor enhancer comprising PH&L digest was dry blended with 30% STPP and used to coat the Standard Cat Food. This was compared with a standard Cat Food coated with a flavor enhancer comprising PH&L digest dry blended with 30% TSPP. The subject cats ate TSPP coated and STPP coated foods in a ratio of about 2 to 1.

Example 3

In three separate trials involving 22, 21 and 24 cats, a flavor enhancer comprising PH&L digest was co-spray dried with 30% STPP and used to coat the Standard Cat Food. This was compared with a standard Cat Food coated with a dry flavor enhancer comprising PH&L digest dry-blended with 30% TSPP. The subject cats showed a significant preference for the STPP, in direct contradiction to Example 2, in which cats showed a preference for dry blended TSPP over dry blended STPP.

Example 4

In a 23 cat trial, a flavor enhancer comprising PH&L digest was dry blended with 30% STPP and used to coat the Standard Cat Food. This was compared with a Standard Cat Food coated with a dry palatability enhancer comprising PH&L digest co-spray dried with 30% STPP. The subject cats displayed a strong preference for the co-spray dried STPP in a ratio of 5 to 1.

Example 5

A flavor enhancer comprising PH&L digest was dry blended with 15% STPP and used to coat the Standard Cat Food. This was compared with a standard Cat Food coated with a flavor enhancer comprising PH&L digest dry blended with 15% TSPP. The subject cats ate TSPP coated and STPP coated in a ratio of about 3 to 1.

Example 6

In two separate trials involving 22 cats each, a dry flavor enhancer comprising PH&L digest was co-spray dried with 15% STPP and used to coat the Standard Cat Food. This was compared with a standard Cat Food coated with a flavor enhancer comprising PH&L digest dry blended with 15% TSPP. The subject cats showed a greater preference for the co-spray dried STPP than in example 5 when dry blended STPP was used.

Example 7

A flavor enhancer comprising PH&L digest was co-spray dried with 30% STPP and used to coat the Standard Cat Food. This was compared with a standard Cat Food coated with a flavor enhancer comprising PH&L digest dry blended with 30% SAPP. In two separate tests the subject cats showed a significant preference for the STPP.

Example 8

A liquid flavor enhancer comprising PH&L digest and 8.5% STPP was spray-applied to coat the Standard Cat Food. This was compared with a standard Cat Food spray-coated with a liquid flavor enhancer comprising PH&L digest and 8.5% TSPP. The two products were at parity in preference testing.

Control

In two separate tests, a control Standard Cat Food coated only with dry animal digest was tested against a test Standard Cat Food coated with the PH&L digest co-spray dried with 15% and 30% STPP. The subject cats showed a preference for the STPP coated cat food.

Table 1 summarizes the results of Examples 1 through 7. "Appl %" refers to the amount of palatability enhancer applied as a percentage by weight of the pet food composition.

dry pet foods. The palatability enhancer is particularly effective for enhancing the palatability to cats of dry and semi-dry cat foods. Further, the use of STPP represents a relatively low added production cost for pet food manufacturers. In addition, the improved palatability enhancing effect of STPP survives a range of different application systems and different formulations.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed:

1. A method of increasing the palatability of an extruded pet food product comprising spraying a liquid palatability enhancing composition including at least one sodium tripolyphosphate salt to said extruded pet food composition, wherein said palatability enhancing composition is applied in a quantity sufficient to contribute from about 0.01 to about

TABLE I

| Example | Control Flavor | Appl % | STPP/SAPP Flavor | Appl % | Preference | Cats/Days |
|---|---|---|---|---|---|---|
| Control | 100% dry PH&L Digest | 2.0 | Co-Spray Dried PH&L Digest with 15% STPP | 2.35* | 1:2.97s | 23/2 |
| Control | 100% dry PH&L Digest | 2.0 | Co-Spray Dried PH&L Digest with 30% STPP | 2.85* | 1:1.90s | 21/2 |
| 1 | Dry blend 70% PH&L Digest + 30% TSPP | 2.0 | Dry blend 70% PH&L Digest with 30% SAPP | 2.0 | 1:1.11 | 20/2 |
| 2 | Dry blend 70% PH&L Digest + 30% TSPP | 2.0 | Dry blend 70% PH&L Digest with 30% STPP | 2.0 | 2.0s:1 | 23/2 |
| 3 | Dry blend 70% PH&L Digest + 30% TSPP | 2.0 | Co-Spray Dried 70% PH&L Digest with 30% STPP | 2.0 | 1:1.5s | 22/2 |
| 3 | Dry blend 70% PH&L Digest + 30% TSPP | 2.0 | Co-Spray Dried 70% PH&L Digest with 30% STPP | 2.0 | 1:1.39s | 21/2 |
| 3 | Dry blend 70% PH&L Digest + 30% TSPP | 2.0 | Co-Spray Dried 70% PH&L Digest with 30% STPP | 2.0 | 1:1.37s | 24/2 |
| 4 | Dry blend 70% PH&L Digest + 30% STPP | 2.0 | Co-Spray Dried 70% PH&L Digest with 30% STPP | 2.0 | 1:4.95s | 23/2 |
| 5 | Dry blend 85% PH&L Digest + 15% TSPP | 2.0 | Dry blend 85% PH&L Digest with 15% STPP | 2.0 | 3.03s:1 | 22/2 |
| 6 | Dry blend 85% PH&L Digest + 15% TSPP | 2.0 | Co-Spray Dried 85% PH&L Digest with 15% STPP | 2.0 | 1:1.04 | 22/2 |
| 6 | Dry blend 85% PH&L Digest + 15% TSPP | 2.0 | Co-Spray Dried 85% PH&L Digest with 15% STPP | 2.0 | 1.28:1 | 22/2 |
| 7 | Dry blend 70% PH&L Digest + 30% SAPP | 2.0 | Co-Spray Dried 70% PH&L Digest with 30% STPP | 2.0 | 1:1.47s | 24/2 |
| 7 | Dry blend 70% PH&L Digest + 30% SAPP | 2.0 | Co-Spray Dried 70% PH&L Digest with 30% STPP | 2.0 | 1:1.96s | 22/2 |
| 8 | Liquid PH&L Digest + 8.5% TSPP | 5.0 | Liquid PH&L Digest + 8.5% STPP | 5.0 | 1.2:1 | 22/2 |

*Adjusted to the equivalent 2% digest in the control sample.
Co-spray drying was conducted using the liquid mixture at pH 4–10.

The foregoing examples thus demonstrate STPP to be a commercially viable palatability enhancer for dry and semi- 5.0 percent by weight of said at least one sodium tripolyphosphate salt to said pet food composition and said palatability enhancing composition further comprises at least one ingredient selected from the group consisting of meat products, meat by-products, fish products, fish by-products, dairy products, dairy by-products, sources of microbial proteins, vegetable proteins, carbohydrates and amino acids.

2. The method according to claim 1, wherein said palatability enhancing composition is applied in a quantity sufficient to contribute from about 0.05 to about 2.0 percent by weight of at least one sodium tripolyphosphate salt to said pet food composition.

3. The method according to claim 1, wherein said liquid composition has a pH between about 2 and about 9.

4. The method according to claim 1, wherein said extruded pet food composition is a dry cat food.

5. The method according to claim 1, wherein said extruded pet food composition is a semi-dry cat food.

6. A liquid palatability enhancing composition for extruded pet food, said composition comprising from about 5 to about 50% by weight of at least one sodium tripolyphosphate salt and at least one ingredient selected from the group consisting of meat products, meat by-products, fish products, fish by-products, dairy products, dairy by-products, sources of microbial proteins, vegetable proteins, carbohydrates and amino acids.

7. The composition of claim 6, wherein said composition has a pH between about 2 and about 9.

8. An extruded pet food composition comprising a spray-applied palatability enhancing quantity of the composition of claim 6, wherein said quantity is sufficient to contribute from about 0.01 to about 5.0 percent by weight of at least one sodium tripolyphosphate salt to said pet food composition.

9. The pet food composition of claim 8, wherein said palatability enhancing composition is present in a quantity sufficient to contribute from about 0.05 to about 2.0 percent by weight of at least one sodium tripolyphosphate salt to said pet food composition.

10. The pet food composition of claim 8, comprising a dry cat food.

11. The pet food composition of claim 8, comprising a semi-dry cat food.

* * * * *